(12) United States Patent
Kano (10) Patent No.: US 7,470,126 B2
(45) Date of Patent: Dec. 30, 2008

(54) METHODS AND SYSTEMS FOR EDUCATION AND COGNITIVE-SKILLS TRAINING

(75) Inventor: Susan Kano, 18 Holiday Rd., Wayland, MA (US) 01778

(73) Assignee: Susan Kano, Wayland, MA (US)

( * ) Notice: Subject to any disclaimer, the term of this patent is extended or adjusted under 35 U.S.C. 154(b) by 304 days.

(21) Appl. No.: 11/248,990

(22) Filed: Oct. 12, 2005

(65) Prior Publication Data

US 2007/0080500 A1    Apr. 12, 2007

(51) Int. Cl.
*G09B 19/00* (2006.01)
(52) U.S. Cl. ..................................... 434/156
(58) Field of Classification Search ................. 434/156, 434/178, 317, 322; 281/15.1; 283/63.1, 283/72, 74; 446/147, 148, 151
See application file for complete search history.

(56) References Cited

U.S. PATENT DOCUMENTS

| | | | | |
|---|---|---|---|---|
| 4,249,757 | A * | 2/1981 | Gella | 281/15.1 |
| 5,380,013 | A * | 1/1995 | Nacht | 273/287 |
| 5,466,158 | A * | 11/1995 | Smith, III | 434/317 |
| 5,618,180 | A * | 4/1997 | Nathanson | 434/156 |
| 6,234,803 | B1 * | 5/2001 | Watkins | 434/156 |
| 6,446,968 | B1 * | 9/2002 | Koch | 273/243 |
| 6,682,074 | B2 * | 1/2004 | Weston | 273/459 |
| 6,967,566 | B2 * | 11/2005 | Weston et al. | 340/323 R |

OTHER PUBLICATIONS

Iain Smyth, "Pirate Plunder's Treasure Hunt: A Pop-Up Whodunit" (Amazon and eBay listings), Sep. 1, 1996 [retrieved online 1/208].*
Jennifer Median, "Adventures Case of Finders Keepers", New York Times, Nov. 14, 2004 [retrieved online Jan. 2, 2008].*
Sean Jeffrey, "Franklin's Big Search-And-Solve Flap Book", May 13, 2005 [retrieved online Dec. 31, 2007].*
Montgomery, R. A., "The Abominable Snowman," Chooseco LLC, Warren, VT, 1982.
"The Treasure Hunt Book," Klutz, Inc., Palo Alto, CA, 2000.
Marzollo, J. and Wick, W., "I Spy Treasure Hunt," Scholastic, Inc., New York, NY, 1999.

* cited by examiner

*Primary Examiner*—Kurt Fernstrom (57) ABSTRACT

Methods and systems are provided for educational and cognitive-skills training. A method of educating a user includes an act of organizing a plurality of clues in a book. At least one search including selected clues from the plurality of clues is included in the book. The search is conducted in the book, and each of the selected clues must be found and solved in a specific predetermined order. The search clues are organized and/or selected to insure that the user cannot move sequentially through the pages. The user determines the solution to each clue to locate the next clue and, ultimately, to locate the end of the search. The solutions are organized and displayed in a predictable way (e.g., alphabetically or numerically) so that the user can "look up" each solution.

28 Claims, 8 Drawing Sheets

402
|
stairs

(stārs)
408

We love to make fires
So we own a stack
Of something we torch
It's gray, brown or black         404

It's made of dead trees
It comes in quite handy
For making a carving
That can be quite dandy You will need some kindling
To get it to burn
You might get to light it
If it's your turn

Clue Locations by Treasure Hunt      <u>836</u>

These alphabetized lists are intended for students who find it difficult to solve the clues. If you need to use one of the lists, photocopy this page and cut out the appropriate list. When you give it to the student, makes sure that he understands the meaning of every word on the list. Also explain that these are the answers to the treasure hunt clues, but they are not in the correct order.

| <u>Level 12</u> | <u>Level 15</u> | <u>Level 18</u> |
|---|---|---|
| bathtub | bike | broom |
| desk | bowl | dishwasher |
| fireplace | firewood | faucets |
| hall | porch | lawn |
| phone | shorts | refrigerator |
| sink | stairs | toothbrush |
| stove | tools | toys |

| <u>Level 13</u> | <u>Level 16</u> | <u>Level 19</u> |
|---|---|---|
| apple | dryer | cellar |
| bunkbed | fence | ceiling |
| candle | playroom | chimney |
| chairs | shampoo | closet |
| comb | swingset | cookies |
| flagpole | table | door |
| light | windows | office |

| <u>Level 14</u> | <u>Level 17</u> | <u>Level 20</u> |
|---|---|---|
| car | bread | camera |
| clock | mailbox | curtains |
| plant | shelf | doormat |
| rug | soup | picture |
| shirt | toaster | shoes |
| slippers | trashcan | suitcase |
| soap | TV | washing machine |

FIG. 8

METHODS AND SYSTEMS FOR EDUCATION AND COGNITIVE-SKILLS TRAINING

BACKGROUND OF INVENTION

1. Field of the Invention

Methods and systems for education and cognitive-skill training, and more particularly, methods and systems that provide search-based education and cognitive-skill training.

2. Discussion of Related Art

A great deal of attention has been devoted to increasing the effectiveness of educational material, for example, by providing material and activities that a trainee (e.g., a student) finds fun and interesting to encourage their participation. General approaches that are currently employed to provide material that students find fun include asking students to locate hidden items. In one approach, items are hidden under a flap located on pages of a children's book. A reader may look for a specific item on the page under the flap. In some other books, readers do not overturn flaps but simply look for objects hidden in figures appearing on the pages of the book.

In another approach, a book provides clues that the reader solves (e.g., a treasure hunt). The search, however, does not occur within the book. Instead, the clues are removed from the book and are hidden around a home in hiding places associated with each clue.

Some books provide a treasure hunt within a book. In one form of a treasure hunt book, rhyming text concerns an item in a picture that is displayed along with the text. The reader identifies the item in the picture and then turns to the next page of the book to repeat the process for a different item. Other books provide instructions concerning how to create your own treasure hunt for participants. Also, short stories for children often provide plots that include a treasure hunt.

Another type of children's book allows a reader to adapt fictional stories based on the reader's decisions concerning the actions of a main character. For example, the reader decides on the main character's next act and then turns to the pages with the story elements resulting from the selected act. Thus, two readers may read two versions of the same story depending on their selection of acts. Also, a single reader may read a different version by selecting different acts when reading the book a second time.

SUMMARY OF INVENTION

In order to provide users with a fun and educational search without a requirement that the search be conducted in a physical environment, at least one embodiment of the invention provides a treasure hunt including clues and solutions to the clues that are located in unpredictable locations within a book. In at least one embodiment of the invention, the solutions can be a wide variety of things including objects, shapes, numbers, names of cities, etc. In one embodiment, users can "look up" the location of a subsequent clue when they figure out the correct answer to the current clue.

In one aspect of the invention, a book is used to develop one or more educational skills. In one embodiment, the book includes clues located in the book and a plurality of solutions where a plurality of the clues are associated with a solution to another clue. At least some of the plurality of clues appear in the book along with the solution with which they are associated. Further, a location of at least some of the plurality of clues within the book is unpredictable to a user of the book.

In one embodiment, the plurality of solutions are words organized alphabetically in the book. In an alternate embodiment, the plurality of solutions are numbers which are organized numerically within the book. In a further embodiment, a search comprises clues selected from the plurality of clues. In versions of these embodiments, an organization of the plurality of solutions enables a user to locate a clue by solving a preceding clue in the search. In a version of this embodiment, the search is a treasure hunt in which a prize is associated with a solution to a final clue in the search.

In another aspect, a book includes a plurality of clues located in the book and at least one search including selected clues from the plurality of clues can be performed within the book. Further, locations of the selected clues within the book are unpredictable to a user of the book. In one embodiment, at least one of the selected clues is associated with both a first identifier with which it appears in the book and a second identifier that solves the clue. In one embodiment, the book includes an image of an environment that includes a plurality of objects.

In yet another aspect, the invention provides a method of educating a user. A plurality of clues are organized in a book. At least one search including selected clues from the plurality of clues is included in the book. The search is conducted in the book and each of the plurality of clues is associated with a location in the book. Further, a location associated with a selected clue is unpredictable to a user. In one embodiment, each of the plurality of clues is associated with an identifier. In a version of this embodiment, the identifier allows the user to locate a subsequent clue in the search. A first clue in the search is solved by identifying a solution associated with a location of a second clue in the search. A second clue is solved by identifying a solution associated with a location of a third clue in the search.

In another embodiment, a plurality of searches include clues selected from the plurality of clues. A plurality of starting clues for the plurality of searches are located together in a first section of the book, and remaining clues included in the plurality of searches are located in a second section of the book.

The preferred embodiment is a book containing at least one search that includes a series of clues that must be solved in a predetermined order; however, the clues in the search are not displayed in that order, so the user must move through the book's pages non-sequentially. The user is presented with the initial clue in a predictable location, but in order to find the next clue, the user must solve the initial clue and look up its solution. Each of the non-initial clues is displayed with an identifier that is a solution to the previous clue in the search. The identifiers are organized in a predictable order, such as alphabetically or numerically, so that each solution is "looked up" rather than searched for at random. Throughout the search, the user must solve the current clue in order to look up a corresponding identifier to find the subsequent material in the search. The last clue's solution leads to a "reward" that communicates to the user that he has completed the search successfully.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present inventions are not limited in their applications to the details of construction and the arrangement of components set forth in the following description or illustrated in the drawings. The inventions are capable of other embodiments and of being practiced or of being carried out in a variety of ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The use of searches, including treasure hunts, is beneficial in education and cognitive-skill development because searches can be adapted to meet a variety of objectives (e.g., provide a student with material that develops more than one skill). In addition, a search format can increase a student's interest in the material that is being presented. Searches can also be used to test a participant's skill level (e.g., searches may be used by an educator to test a participant's reading comprehension and/or logical reasoning skills).

A search includes the act of trying to locate someone or something. For example, a search can be employed to locate a person, a tangible thing (e.g., car keys), a concept (e.g., identify the force that causes an apple to fall from a tree to the ground), a number (e.g., the sum of two numbers), or a piece of information (e.g., the location of buried treasure). According to one embodiment, a search includes the act of identifying someone or something. For example, a search may include clues with solutions that identify a location of a subsequent clue in the search. In one embodiment, a search includes a plurality of clues where the solution to each clue, except the final clue, leads to another clue.

Current approaches, however, allow a searcher to predict the location of one or more clues used in the search with ease. For example, in current approaches, a searcher may know that each of a number of clues appear on the same page of a book, or on an adjacent page of a book.

A clue is any kind of content for which there is an unstated solution or answer. A clue may be presented in any form including, but not restricted to: a rhyme, a description, a question, a math problem, or a word problem that involves math.

As one example, searches can provide both an opportunity for a participant to practice reading comprehension and an approach that can be used by educators to establish the participant's skill level at reading comprehension. As another example, searches can provide an opportunity for a participant to practice geography skills or to be tested on those same skills. A search may be suitable for both practice and testing. In addition, searches provide an approach suitable for practice and/or testing of a participant's abilities to draw inferences, look up words (e.g., practice "dictionary" skills), solve equations (e.g., practice mathematical skills), write and spell. Further, although these particular skills have been identified, the general approach may be applicable to other skills and contexts. Also, an approach can simultaneously combine practice and/or testing for two or more of the preceding skills or any of the preceding skills and other skills, for example, shape-identification.

While not all embodiments of the present inventions are directed to cognitive-skill development (e.g., logical reasoning), as opposed to education (e.g., learning vocabulary), or entertainment, the present inventions may be specifically adapted for the purpose of education and cognitive-skill development. No one embodiment need be directed to any one of these, and searches may be constructed with all three purposes in mind.

Where one or more searches are used for education and/or cognitive-skill development, the training material and lesson format may be organized to vary the range of skills that are tested when the participant conducts the search. As a specific example, a treasure-hunt-type search can combine lessons regarding reading skills with lessons that develop the participant's ability to draw inferences and develop their ability to select words from among an alphabetized list of words. The training material and lesson format can also be organized to provide a sufficient challenge to participants. In this manner, the participant is motivated to continue their participation until the search is complete. In one embodiment, search clues are organized and/or selected so that the location of the clues is unpredictable to the participant. In some instances, the locations of the clues appear to be randomly selected. In a version of this embodiment, search clues are organized and/or selected to insure that the participant cannot move sequentially through material. That is, in the context of a treasure hunt that includes a series of clues, the solution to a clue is not placed adjacent to the clue within the series. In one embodiment, none of a plurality of clues included in a series is adjacent to its solutions.

According to one embodiment, a plurality of clues are located together in a book where clues are located with a solution to a preceding clue in a search. In one embodiment, the location of clues in a search are unpredictable to a participant in the search unless a previous clue in the search is solved. In a version of this embodiment, the location of clues in a search are unpredictable to a participant in a search unless both the answer to a preceding clue in the search is known, and the participant also knows how to locate the solution to the preceding clue among an organized plurality of solutions. In one embodiment, the solutions are organized alphabetically in the manner of a dictionary. As a result, in this embodiment, a participant in a search must understand how to work with material organized in a particular manner (e.g., alphabetically) to successfully complete the search. Further, according to one embodiment, the location of subsequent clues continues to remain unpredictable throughout the search even though the participant may have previously solved a plurality of clues.

Generally, the degree of difficulty of a search may be varied, for example, by providing more difficult reading assignments required to identify clues, by employing a larger vocabulary of words used to identify objects in an environment, and by including more subtle clues. Of course, the factors that affect the degree of difficulty will vary depending upon the skills that are being tested, e.g., the difficulty in geography skill training can be varied by including less well known geographic locations as the solutions to the clues or employing more difficult concepts such as country-shape outside of a map rather than on a full map.

In addition, searches may be tailored to the participant's skill level to provide more productive training. In some embodiments, the skill levels are educational skill levels that are used to ensure that a student has been taught the skills needed to successfully complete the search before beginning the search. According to one embodiment, a set of searches can be used to test students at a variety of skill levels by making available at least one search for each skill level. According to this embodiment, a student can begin with a search having a low level of difficulty. The student progresses to searches that include more challenging material after successfully completing one or more searches at a lower skill level, e.g., the next lower skill level. Such an approach allows the student to complete searches successfully while learning; thereby, encouraging the student to continue the training at increasing levels of difficulty.

A participant's interest may be increased when search clues are associated with objects in an environment (e.g., objects presented in an image of an environment) such as a house or an apartment, a landscape, a store, a street front or any other environment that includes one or more objects. The environment may be an environment that the searcher is familiar with or an environment that is new to the searcher. One or more images of the environment may or may not be included in the medium in which the search is being completed. For example, in one embodiment, a book in which a search is conducted may include clues and may not include images of an environment. In other embodiments, however, the book may include at least one image of an environment including images of objects with which the clues are associated. A book is an item with a plurality of pages, and pages within a book provide a static display whether they are presented in a hardcopy format or an electronic format such as an ebook (e.g., they are scanned or converted to pdf). In addition, an image of a book can be presented in video format (e.g., a videobook) to allow it to be read on a monitor or other display.

The above mentioned approach is well suited to assisting anyone, but particularly children, with their academic performance. In one embodiment, a plurality of clues, lesson plans including one or more environments, and suggested skill-level based searches are provided in the medium for use by an instructor (e.g., a teacher) in preparing and presenting material to students.

In general, in accordance with one embodiment, objects in the environment are associated with an identifier that identifies the object, for example, where an automobile appears in an environment it may be associated with the identifier "car." In the context of a lesson that employs a search as a training tool, a clue can be provided to a searcher that suggests the automobile object. A searcher who properly understands the clue may locate the automobile and then refer to the identifier "car" which is a solution to the clue. A second clue that refers to another object associated with another identifier that identifies it may be located with the solution to the previous clue, i.e., co-located with the identifier "car." That is, the searcher identifies the object suggested by the clue in order to locate the subsequent clue in the search. The second object may, for example, be a phone and the identifier associated with it may be "phone" or perhaps "telephone" depending upon the skill level of the search. A search can include a series of clues (e.g., a plurality of clues) that when correctly interpreted lead the searcher to the search's conclusion, for example, lead the searcher to a treasure chest or some other prize.

According to one embodiment, the identifiers are words that designate an object, generally, a word commonly used to designate the object, e.g., the object "automobile" is identified by the identifier "car." In one embodiment, the identifier uniquely identifies the object, i.e., the identifier is a unique identifier. Thus, identifiers can include names of places, names of people, names of things and the like. Further, the identifiers may be organized alphabetically. In an embodiment where the identifiers are numbers, a first clue can provide a first mathematical problem (e.g., solve the equation 4×4) where the solution is a numerical identifier (e.g., 16). In a version of this embodiment, a plurality of numerical identifiers are organized numerically in a medium, for example, a book.

Further, the clues can be provided in a variety of formats including pictorial or graphical. For example, in one embodiment, the clues present a geometric shape. The searcher solves the clue by identifying the type of the shape (e.g., an ellipse) and locating an identifier for the shape (e.g., the word "ellipse"). Conversely, a text description of an object may be provided (e.g., a 3-D geometric shape having a constant radius) to a participant in a search. In this embodiment, the identifiers may be images of a variety of geometric shapes. Further, the solution is the geometric shape that most closely matches the text descriptions (e.g., an identifier that is an image of a sphere). Images can also be used, for example, to further engage young search participants by, for example, providing clues that can be filled-in (e.g., colored) by the searcher.

Further, it should be recognized that many other forms of identifiers can be employed either alone or in combination. For example, where mathematical skills are being tested and/or practiced the identifiers may be numerical solutions to mathematical problems. In a version of this embodiment, the clues are mathematical problems, e.g., addition, subtraction or more complex equations for more advanced students. It should also be recognized that objects need not form a part of the search. Where objects are not employed, a searcher may directly determine an identifier that is the solution to a clue.

An image of an environment may or may not be used with various embodiments. According to one embodiment, where an image of an environment is not presented, the identifiers are organized in alphabetical order in the manner of a dictionary. In yet another embodiment, an environment is employed along with a dictionary-style organization of identifiers. A clue associated with the identifier can be co-located with the identifier in any of the preceding embodiments. In a version of this embodiment, both the environment and an organized group of identifiers are included in the same medium, e.g., a book.

In an alternate embodiment, identifiers are not used to associate an object with a clue in the search. Instead, an image of the object is the location of the next clue in the search, e.g., the object itself is the solution to the clue. In one specific example, a student uses a search to practice identifying geometric shapes. In this embodiment, a clue appearing with an image of a first shape can suggest a second shape whose image appears with a subsequent clue. Thus, in this embodiment, the searcher employs the visual identification of the object without the need to refer to an identifier or an organized group of identifiers to locate clues in the search. In a version of this embodiment, the images of the objects are located in a series of pages in a book.

A search can include any quantity of clues. In one embodiment, a search includes a quantity of clues sufficient to achieve an educational objective, for example, a search can provide a student with opportunities to employ newly-learned vocabulary words.

A conclusion to a successful search can be indicated in a variety of ways. In one embodiment, the search concludes with a reward (e.g., a prize) being awarded to the searcher. The prize can be virtual or actual. That is, a treasure hunt may conclude with an image of an open treasure chest full of valuable items being displayed to the searcher, e.g., displayed on the page of a book. It should be recognized that a prize, however, need not be awarded at the conclusion of a successful search.

According to one embodiment, to receive a prize, a participant in a search provides evidence that the search was successfully completed (e.g., a completed answer sheet). The evidence can take many forms, for example, the evidence may be an ordered sequence of identifiers (words or numbers) that solve the clues in the search. An exchange of the evidence with the prize may occur in person, via mail or over the Internet.

Figure 1:
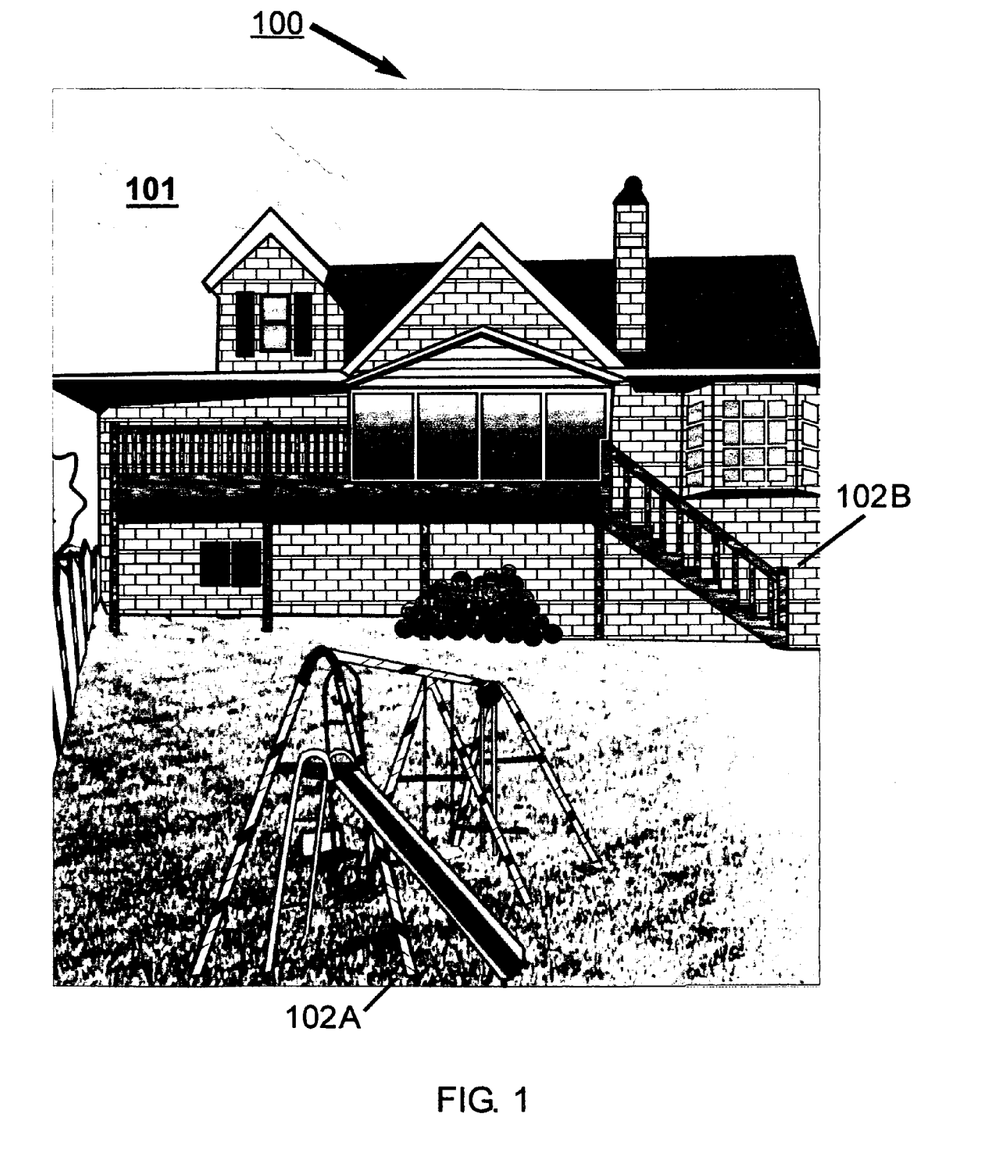
FIG. 1 illustrates an environment employed in one embodiment of the invention.

FIG. 1 illustrates a display 100 (e.g., a page of a book, a cover of a book) that includes an image of a search environment 101 in accordance with one embodiment of the invention. The search environment 101 (e.g., the outside of a home) is included in a medium (e.g., a book) along with a plurality of clues. The search environment 101 includes a variety of objects (e.g., swing 102A). According to one embodiment, each object is associated with an identifier that identifies the object, for example, the words "swing set" may be the identifier that identifies the swing 102A. The identifier can provide a solution to a clue associated with the environment. Thus, a clue concerning the swing 102A might provide a hint such as the following rhyme:

Matching chains are hanging
Below a pipe and sky
On a rainy day
This thing does not stay dry The lawn, the deck and the fence are additional objects appearing in FIG. 1 that may or may not provide a solution to a clue.

In one version of this embodiment, the identifier "swing set" is associated with a clue to another object within the environment 101 shown or an object that appears in another environment (e.g., an environment related to the environment 101) that is accessible in the medium. That is, the searcher looks up the identifier "swing set" and finds a clue. The clue provides another hint or suggestion that is solved when the searcher identifies another object and its identifier. For example, the clue associated with the swing 102A and the identifier "swing set" may refer to an object within the home (e.g., a playroom). In this example, the clue associated with "swing set" may be the following rhyme:

A room that's filled with toys
Where children can have fun
A brother and a sister
A father with a son Because this clue refers to a playroom, a successful search would continue with the searcher locating the playroom in the environment and proceeding to the identifier associated with it (e.g., "playroom"). The identifier "playroom" would have either another clue associated with it (e.g., provide the location of the subsequent clue) or it may provide a conclusion to the search by disclosing the object being searched for, for example, a treasure chest can be associated with the identifier "playroom" instead of another clue.

It should be recognized, however, that the book or other medium need not include any environment or an image thereof. In one embodiment, the searcher identifies objects and corresponding identifiers without using an image of an environment. In a version of this embodiment, a clue concerning a swing and a clue concerning a playroom are used. For example, the searcher locates the identifier "swing set" on a page in a book where the clue concerning the playroom appears. The searcher then proceeds to a page where the identifier playroom is located.

Because objects may be accurately described by more than one identifier (e.g., "phone" and "telephone"), it may be advantageous to provide multiple identifiers that are a correct solution to a clue. In another specific example, both "phone" and "telephone" can be a correct solution to the following clue:

It rings and it rings
We use it to call
It can sit on a desk
Or hang on a wall

In one embodiment, the clue that is associated with each of "phone" and "telephone" is the same so that the searcher can successfully conclude the search (e.g., by finding a treasure) regardless of whether they choose the identifier "phone" or "telephone" to solve the clue for which the two words are a solution. As is seen from the preceding, a clue may be associated with more than one identifier.

According to one embodiment, the display 100 refers generally to the image or images presented to the searcher. Thus, the display 100 does not refer to a single type of medium. For example, the display 100 may be a page in a book. Alternatively, the display 100 may be a screen in an electronic display.

Figure 2:
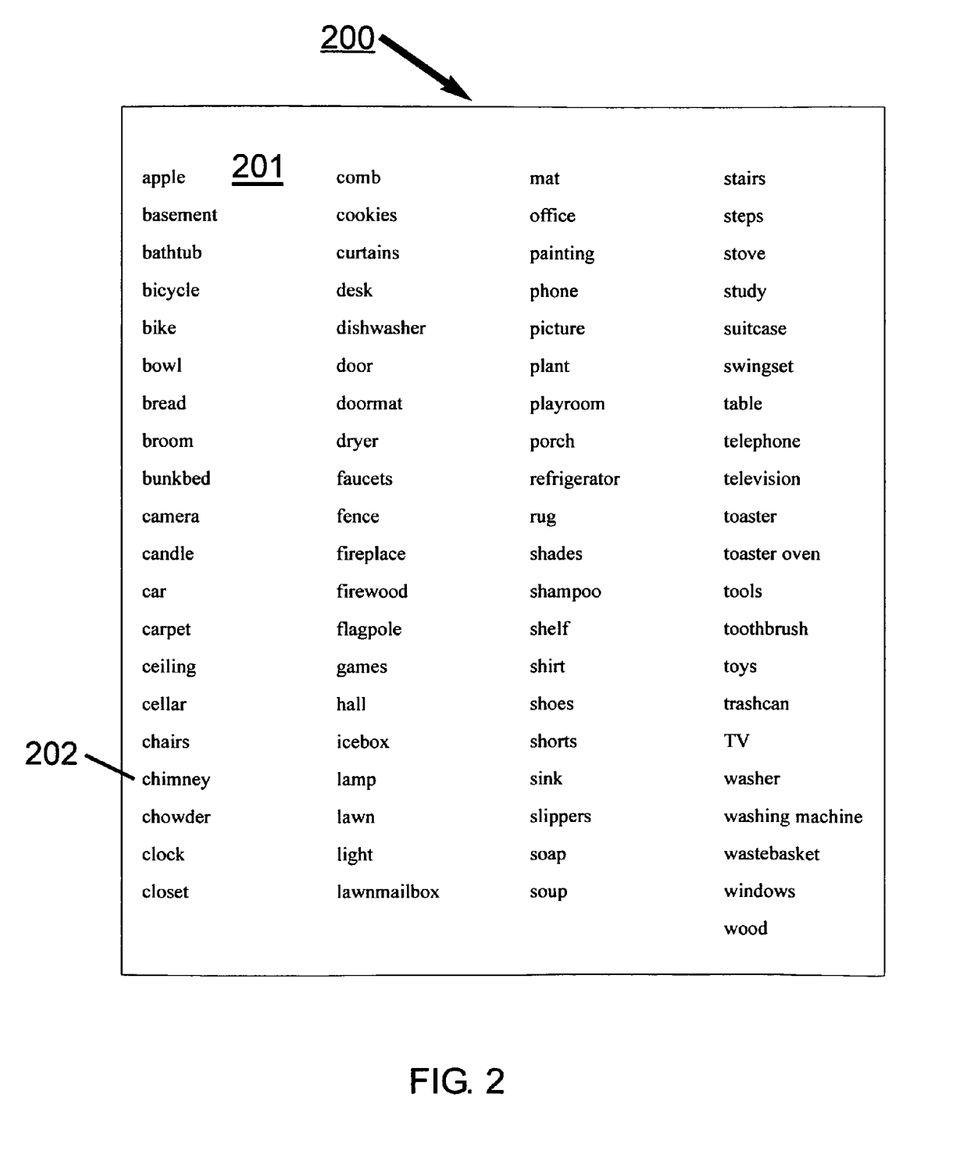
FIG. 2 illustrates a group of identifiers employed in one embodiment of the invention.

Referring now to FIG. 2, a display 200 includes a group of identifiers 201 maintained in a medium. In one embodiment, the group of identifiers 201 appears on a page in a book. The group includes a plurality of individual identifiers (e.g., chimney 202) arranged alphabetically. According to one embodiment, each identifier designates an object. In a version of this embodiment, each object is included in one or more environments (e.g., environment 101 of FIG. 1) viewable within the same medium as the group of identifiers 201. The medium can also include clues to a search where the clues can be located in the medium via one or more of the identifiers 201.

According to one embodiment of an educational and cognitive-skill development system, two or more of the individual identifiers 202 are selected for inclusion in a search used to increase the knowledge and skills of a user. A first clue provides a start to the search. The user reads the clue to determine the solution suggested by the clue and the identifier (e.g., a designation of an object) corresponding to that solution. The identifier that is the solution to the first clue includes a second clue. In one embodiment, these details can also be found in the medium (e.g., the book). In one embodiment, the information associated with the individual identifier 202 includes a second clue. The second clue suggests another solution with another identifier from the group of identifiers 201 that corresponds to it.

The group of identifiers 201 can be used to create a variety of searches, for example, searches based on the educational and/or cognitive-skill level of the user. The searches may, but need not, include all of the individual identifiers 202 included in the group of identifiers 201. Instead, searches may include a selected subset of individual identifiers 202 found in the group of identifiers 201. Such an approach may be advantageous in providing a search that can be completed quickly enough so that the user does not lose interest and provide students and instructors with multiple interesting and challenging searches within the same medium, e.g., the same book. In addition, the selected subset may include a group of identifiers that are suitable for a first skill level. Accordingly, another search designed for a different skill level would include one or more identifiers that are not found in the search designed for the first skill level. The skill level may be an educational skill level (e.g., the user's reading-skill level and vocabulary-skill level), a cognitive-skill level (e.g., the user's spatial location/orientation ability or inferential reasoning ability), or a skill level that accounts for both the user's educational skill level and their cognitive-skill level.

According to one embodiment, a medium includes identifiers for a plurality of searches to be performed within the medium. In a version of this embodiment, the medium includes a group of identifiers 201 for a plurality of skill levels. In one embodiment, a first section of the medium (e.g., a page or adjacent pages of a book) includes the starting clues for each of a plurality of searches. A second section of the medium (e.g., a group of pages appearing elsewhere in the book) includes the remaining clues used in the plurality of searches. In a version of this embodiment, the clues located in the second section each appear with an identifier and the identifiers are organized alphabetically within the second section.

In one embodiment, where the medium is a book, the search may be performed within the book, or within an appropriate physical environment. In a version of this embodiment, the back of each page containing a clue is left blank so that the clues can be torn out and hidden within an appropriate physical environment (e.g., at a home or school). The search participants then move within the environment as they solve the clues. In a version of this embodiment, the back of each page containing a clue is left blank so that the clues can be hidden individually.

The search can provide testing of and/or practice in additional educational skills including: looking up words in an alphabetical list of entries (e.g., dictionary skills); interpreting pronunciation keys; applying phonetic rules to sound out words; recognizing words that do not follow phonetic rules; reading fluency; reading comprehension; vocabulary; spelling; arithmetic (e.g., mathematical problem solving); geometry; algebra; and subject knowledge (e.g., in geography, foreign languages, sciences, history, religion, etc.).

The search can also provide testing of and/or practice in visual-spatial skills and logical reasoning skills including: discriminating between visual designs or objects to determine their similarities or differences; finding an object among other objects or within a design; locating oneself in an environment using a map; orienting oneself in an environment relative to a map; and understanding how objects and representations in different scales relate to each other.

Figure 3:
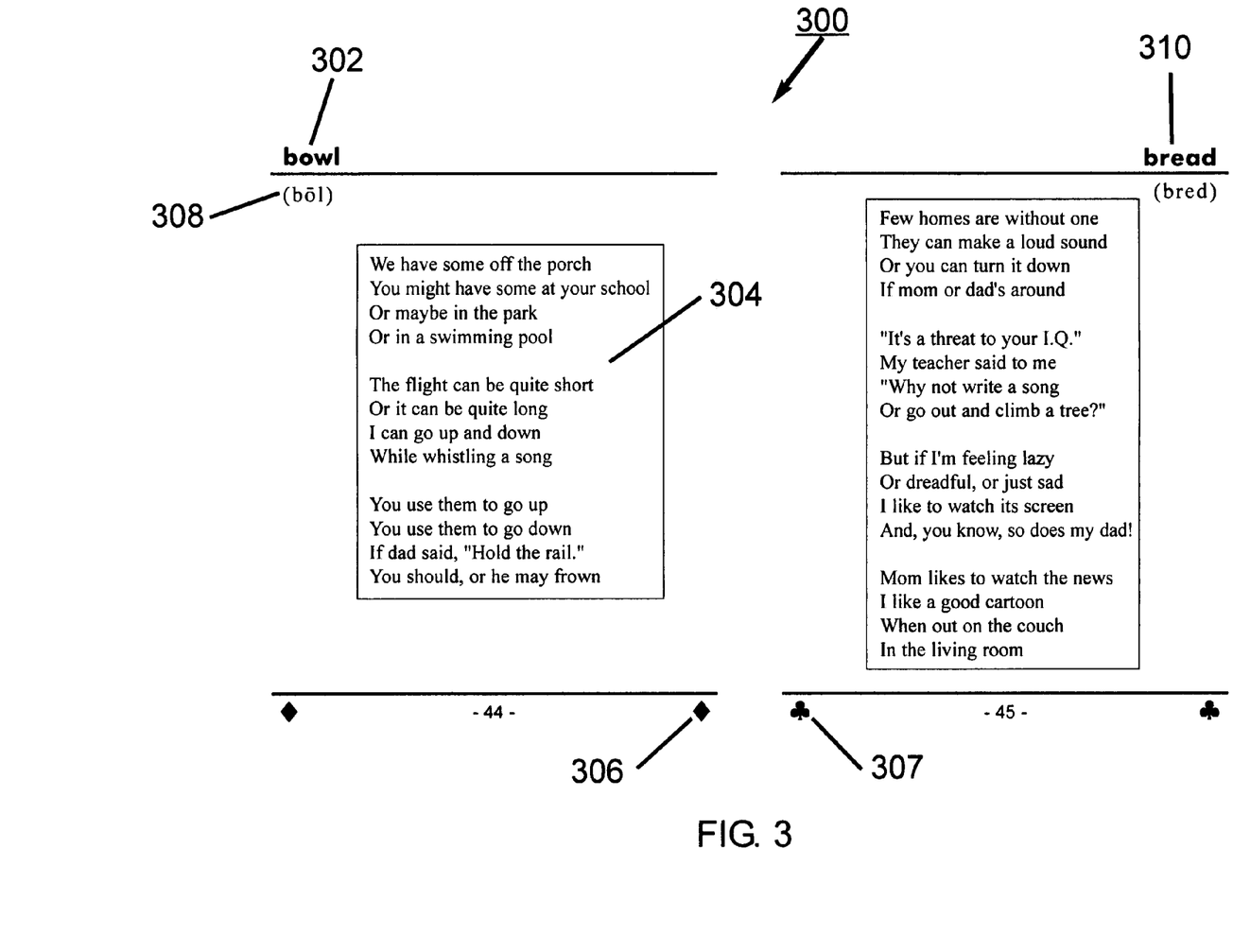
FIG. 3 illustrates a display according to one embodiment of the invention where the display includes two clues.
Figure 4:
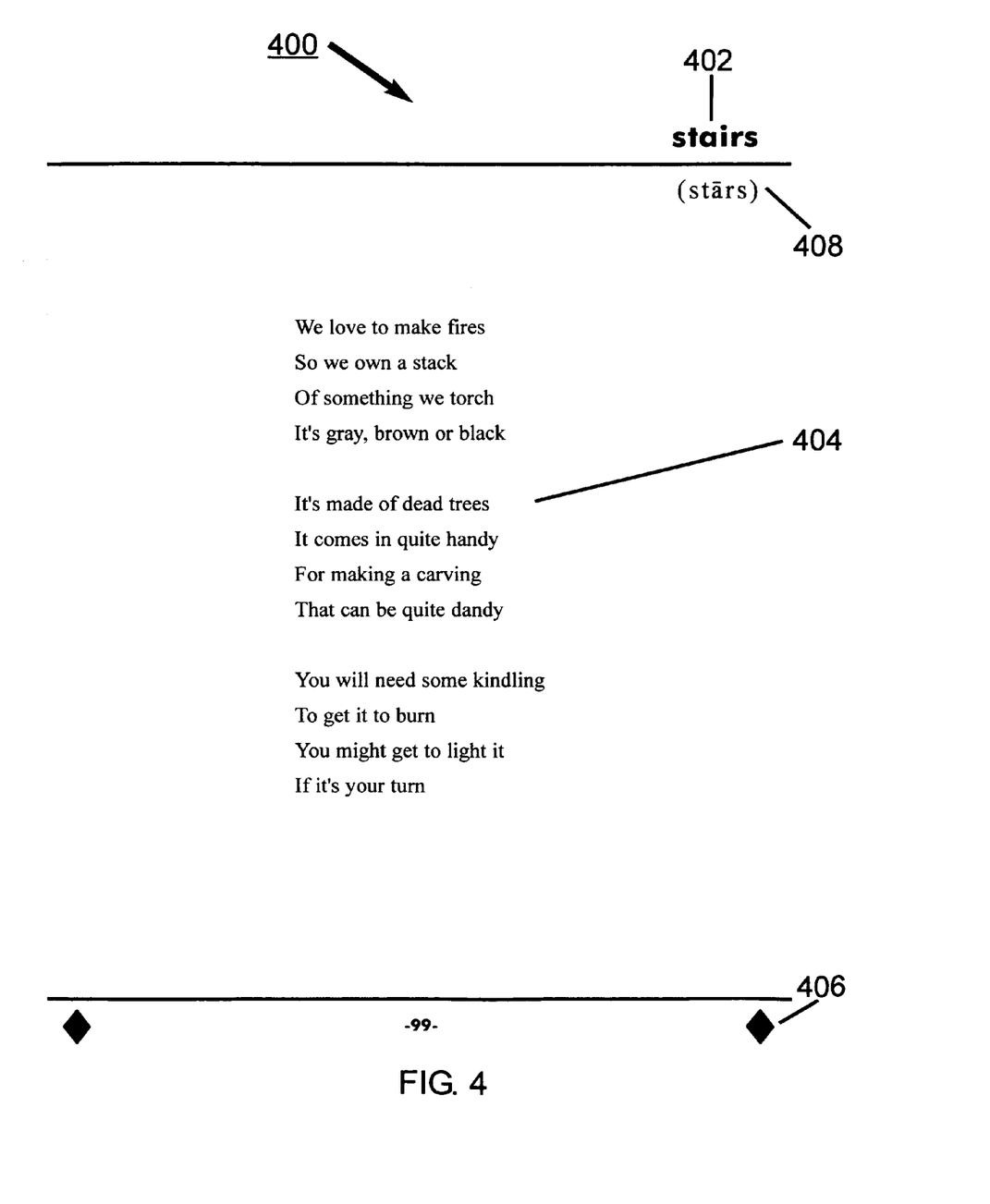
FIG. 4 illustrates another display according to one embodiment of the invention where the display includes two clues.
Figure 5:
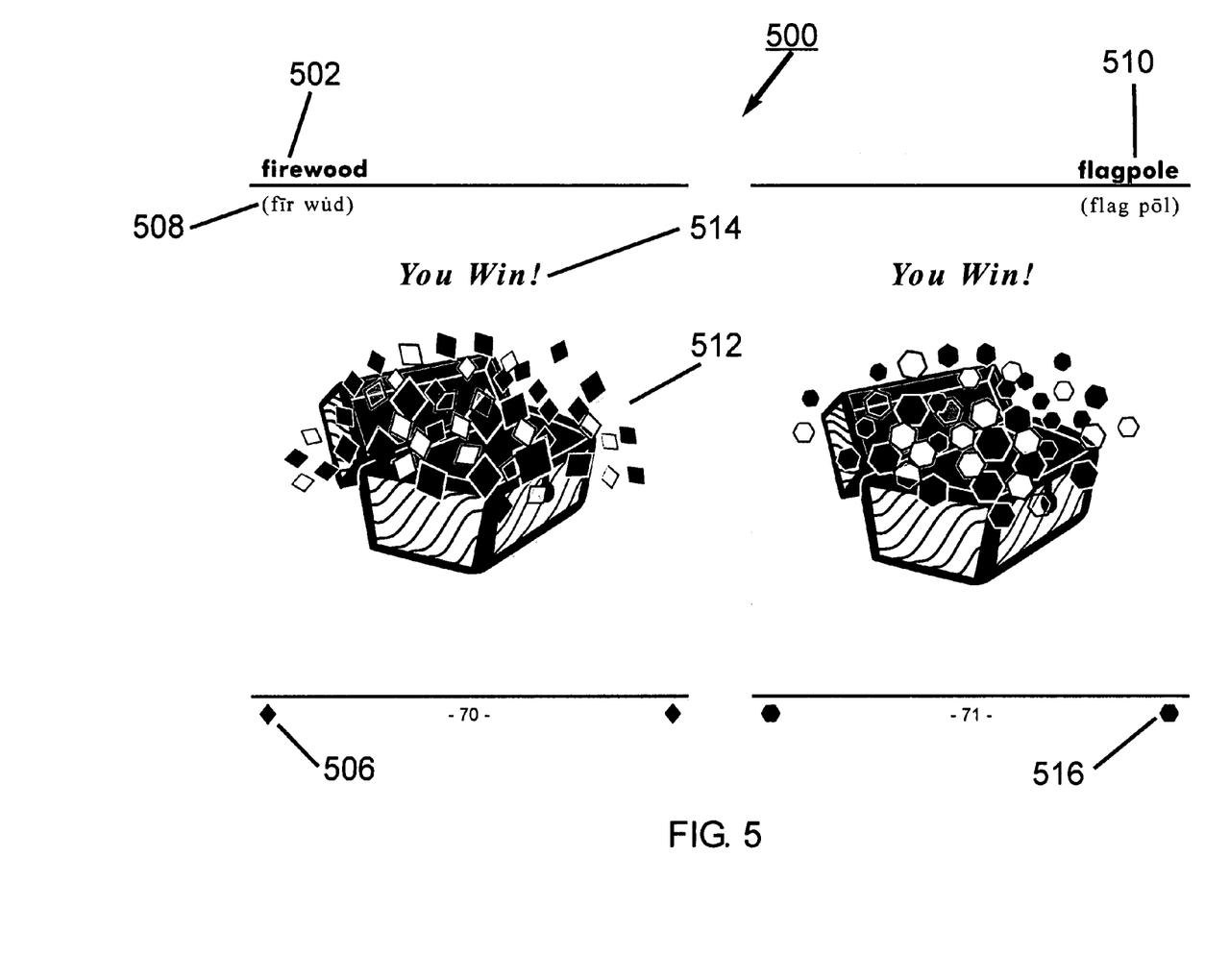
FIG. 5 illustrates yet another display according to one embodiment of the invention where the display includes two rewards.

FIGS. 3, 4 and 5 provide embodiments that further illustrate how identifiers and associated clues may be related in a search. FIG. 3 illustrates a display 300 that includes two identifiers 302, 310 and information associated with each identifier. In a version of this embodiment, the display 300 represents two adjacent pages in a book where the left page includes the identifier 302 and the right page includes the identifier 310. In the embodiment of FIG. 3, a clue 304 is located with an identifier 302 (e.g., bowl). In this embodiment, the clue is a twelve (12) line rhyme that refers to some other object (i.e., something other than a bowl). Additional information concerning the identifier is also included in FIG. 3. Specifically, FIG. 3 includes indicia 306 (e.g., a diamond) and educational information 308 that are associated with the identifier 302 (e.g., a pronunciation key). Although the clue 304 of FIG. 3 is in the form of a rhyme, the clue 304 may be presented in any form. According to one embodiment, the indicia 306 identifies the search that is associated with the identifier 302. The indicia 306 can be associated with the identifier 302 in a variety of ways. For example, the indicia 306 may appear on the same page as the identifier 302. In a version of this embodiment, the indicia 306 helps the user determine whether they are on the correct search path. That is, before beginning the search the user is made aware that they are participating in a search corresponding to indicia 306 (e.g., the diamond). As a result, each identifier 302 in the search will appear with the diamond-shaped indicia 306. Thus, the user knows that if they select an identifier associated with a clover-shaped indicia 307 during the search they are no longer on the correct search trail. Thus, in one embodiment, a user receives a positive confirmation that they are on the correct search trail when they locate a solution to a clue. In one embodiment, the search associated with the indicia 306 corresponds to a particular skill level.

According to one embodiment, the educational information 308 is a phonetic pronunciation (i.e., a pronunciation aid) for the identifier 302. It will be recognized, however, that educational information associated with the identifier 302 can be any form of information that assists the user in interpreting the identifier, or in further testing and/or development of their skills. In addition, the educational information can be combined with a related audio stimulus to further assist the user, for example, an audio tape or CD that can be employed with a book.

According to one embodiment of FIG. 3, the identifier 302 and its associated details are presented alone in the display 300 (e.g., alone on the page of a book). The identifier 302 and associated details may also be presented in conjunction with another identifier 310, for example, another identifier from among the group of identifiers 201 in FIG. 2. For example, the identifier 302 (e.g., bowl) and the identifier 310 (e.g., bread) appear consecutively in the group of identifiers 201 because the identifiers 201 are organized alphabetically. Thus, the identifiers 302, 310 and their associated details (e.g., clue 304, indicia 306, educational information 308, etc.) may be displayed together as shown in FIG. 3. For example, adjacent identifiers 302, 310 within the group 201 may appear on a single page of a book or on adjacent facing pages.

The clue 304 located in association with the identifier 302 provides one or more hints regarding the identity of another object and its identifier that are also a part of the same search (e.g., the search corresponding to the skill level associated with the diamond-shaped indicia 306). In the embodiment shown in FIG. 3, the clue 304 includes multiple suggestions regarding the next object in the search. The user identifies the next object to determine the identifier corresponding to it in order to locate the next clue in the search. In FIG. 3, the first stanza of the clue 304 provides hints at the location of the object (e.g., "off a porch," "in a swimming pool," etc.). The second stanza includes hints that describe the general structure of the object (e.g., "short," "long") while also mentioning a fin activity (e.g., "whistling"). The last stanza includes hints regarding the use of the object (e.g., "go up," "go down").

To provide a variety of challenges, the clues can contain various creative ways of hinting about the identity of the object. Thus, even where all the clues are in the format of a poem, each poem can be structured differently, for example, one poem may include a hint concerning the objects use among family members while another poem may describe the object in the context of a school. The two approaches and others can be combined in a single poem.

Clues can take different forms. For example, a clue could simply describe a place (e.g., "the capital of Texas"), or ask a question (e.g., "What musical instrument has twelve pairs of strings tuned an octave apart?"). Or a clue could consist of a math problem (e.g., "245×23"), or a word problem that involves math (e.g., "If I buy two dozen roses and I give 5 to Mary and 6 to Rob, how many roses will I have left?"). Identifiers can also take different forms to correspond to the format of the clues (e.g., they could be a name of a city, a numeral, etc.).

A user may use one or more of the hints provided in the clue 304 to determine the object (i.e., stairs) and the identifier associated with it (e.g., stairs, stairway). As previously mentioned, in one embodiment, the user may also refer to an environment that includes the object to obtain a visual clue regarding the possibilities. Referring back to FIG. 1, a flight of stairs 102B appears on the right center of the environment 101 extending from the deck to the lawn. In one embodiment, for each of the identifiers included in the group of identifiers 201 of FIG. 2 the user is provided with the information associated with each (e.g., the clue 304). In a version of this embodiment, the identifiers (e.g., 302) are organized alphabetically, for example, in a dictionary-style arrangement. To assist the user, the user may or may not also be provided with either or both of the group of identifiers 201 or a list of the plurality of identifiers that are included in the search.

Referring now to FIG. 4, the identifier 402 (e.g., stairs) that describes the next object in the search and provides the location of the next clue is shown in a display 400. The identifier 402 is also associated with a clue 404, an indicia 406 and educational information 408. The user can once again refer to the indicia 406 to confirm that they are on the correct track. The user can also refer to educational information 408 that may further assist them in reading and pronouncing identifier 302 or in developing their educational or cognitive-skills.

In the embodiment shown in FIG. 4, the clue 404 is in the form of a 3-stanza rhyming poem. The user interprets the clue 404 in a manner similar to that described relative to clue 304. The user's interpretation, if successful, will identify yet another object and its associated identifier. Once identified, the object and the identifier will lead the user to another clue (or to a search conclusion) that is immediately subsequent to the clue 404 in the search. Thus, the clue 404, the clue 304, and the clue associated with the object suggested by the clue 404 may suggest three consecutive identifiers included in the search. A series of identifiers and their associated clues from the group of identifiers 201 may be arranged together in this fashion to form a complete search.

As is seen from the preceding, an identifier may be associated with more than one clue. For example, an identifier may be associated with a first clue for which it provides a solution, and a second clue with which it is displayed. Referring to FIGS. 3 and 4, the identifier "stairs" is associated with the clue with which it appears on page 99, and the identifier "stairs" is also associated with the clue appearing on page 44 for which it is a solution.

As mentioned previously, according to one embodiment, the location of clues in the medium (e.g., within a book) is unpredictable to the user. That is, until a clue is solved the identifier is not known and the organization of the identifiers does not allow the user to predict the identifier associated with the next clue in the search. In a version of this embodiment, identifiers that solve consecutive clues in a search do not appear adjacent to one another in the group of identifiers 201. For example, to maintain the unpredictability, it may be advantageous not to employ adjacent identifiers in the group of identifiers 201 to solve consecutive clues in a search that includes a first identifier that solves the first clue in the search, a second identifier that solves the second clue, and a third identifier that solves the third clue. In one embodiment, however, adjacent identifiers occasionally do solve consecutive clues to achieve an appearance of randomness among the location of the identifiers and the clues in the medium. As is seen from this example, non-adjacent refers to non-adjacent in the context in which the information is organized (e.g., alphabetically, numerically, etc.). As a result, consecutive clues in the search will not be adjacent in the organized material where identifiers that solve consecutive clues in a search are not adjacent because the identifiers are employed to locate the clues in the search. Elements in a book are non-adjacent when they do not appear either on the same page or on an adjacent page.

In the preceding example, clue 304 precedes clue 404 in the series of clues. The identifier 402 is a solution to clue 304 but the identifier 302 and the identifier 402 are not adjacent among the group of identifiers 201. Thus, the user moves through the material presented in the medium non-sequentially in order to select the correct identifier. In one embodiment, such an approach provides the user with practice beneficial to improving one or more educational skills (e.g., dictionary look-up skills) or one or more cognitive skills (e.g., spatial localization/orientation). This approach may also benefit the user simply because it results in the user seeing a greater volume of material. In a version of this embodiment, the identifiers are organized in an alphabetical sequence similar to that used in dictionaries. In this version, a search is constructed with a plurality of identifiers where identifiers that solve consecutive clues in the search (e.g., identifier 302 and identifier 402) are organized non-adjacent to one another in the search medium (e.g., identifier 302 "bowl" is not adjacent to identifier 402 "stairs" in an alphabetized group of identifiers in a book, in a electronic medium, etc.). Thus, to continue the search that includes identifiers, 302, 402 in a manner consistent with this embodiment, the identifier immediately subsequent to identifier 402 (e.g., "stairs") should be any of the group of identifiers 201 except for "soup" and "steps."

In an embodiment that includes mathematical clues, the identifiers may, for example, be numbers that are organized numerically in the medium. In a version of this embodiment, the location of the clues is unpredictable to the user.

Referring again to clue 404, the clue 404 suggests that the object is logs or firewood. Because the identifier "logs" is not included in the medium, a successful searcher will instead locate the identifier 502 (i.e., "firewood") shown in display 500. The identifier 502 includes indicia 506 and educational information 508 in a manner similar to the indicia and educational information that appear in displays 300 and 400. Instead of a clue, however, display 500 includes a reward (e.g., a prize) 512 that is presented for a successful conclusion to the search. The display 500 can also include text 514 (e.g., "You Win") or any other message that communicates to the user the idea that they have successfully concluded the search.

As described above, the indicia 506 can be used to confirm to the user whether the reward 512 does correspond to the correct search (i.e., the search that the user is on). That is, a user who finds clues in a search associated with a heart-shaped indicia will realize that they selected an incorrect identifier if they select "firewood" because "firewood" is associated with diamond-shaped indicia 506.

Multiple identifiers 202 included in the group of identifiers 201 may be the location of a prize or some other form of conclusion to a search, e.g., something other than another clue. According to one embodiment, there is a different identifier used to conclude each of a plurality of possible searches. In a version of this embodiment, there is a separate search possible for each of a plurality of skill levels. Each of the searches can include a separate final identifier that is associated with the completion of the search that it is a part of.

In the embodiment shown in FIG. 5, the display 500 includes two identifiers 502 and identifier 510 (e.g., "flagpole") where each is a final identifier. Accordingly, a reward (e.g., 512) is located at, or otherwise associated with, each of identifiers 502, 510 to reward the user at the conclusion of the search. In the display 500 in FIG. 5, the identifier 502 provides a conclusion to a search associated with diamond-shaped indicia 506 and identifier 510 provides a conclusion to a search associated with hexagon-shaped indicia 516.

In yet another embodiment, a skill level is associated with indicia having a specific shape and a plurality of possible searches are available for that skill level. As a result, the group of identifiers 201 may include more than one final identifier for that skill level. The actual search and its conclusion will depend upon the identifiers selected for that skill level from among the group of identifiers 201. The selection of the search may be made by an instructor based on the results of a skill-level assessment.

According to one embodiment, the content and organization of an educational system provides an instructor (e.g., a teacher) with material and approaches that they can use with their students. One example set of material for instructing students of varying skill levels includes: one or more groups of identifiers (e.g., identifiers 201 of FIG. 2); the identification of one or more sets of identifiers suitable for use with each skill level; the identification of one or more series of identifiers used to form a skill-level based search; one or more initial identifiers and associated clues used to begin a skill-level based search; and one or more forms used by students to record the identifiers that they used in performing an assigned search. In addition, the educational system may include one or more lesson plans that include any one of the items described above. The preceding items can each be included alone or in combination with the other listed items in a book or other set of hardcopy material. Further teaching aids include: directions explaining how to use the book with students; instructions for assessing the skill levels of their students; tools for selecting appropriate searches for students (which may correspond to a specific reading-skill level); various solution keys, including word-banks to assist students that are having difficulty; and review material.

Figure 6:
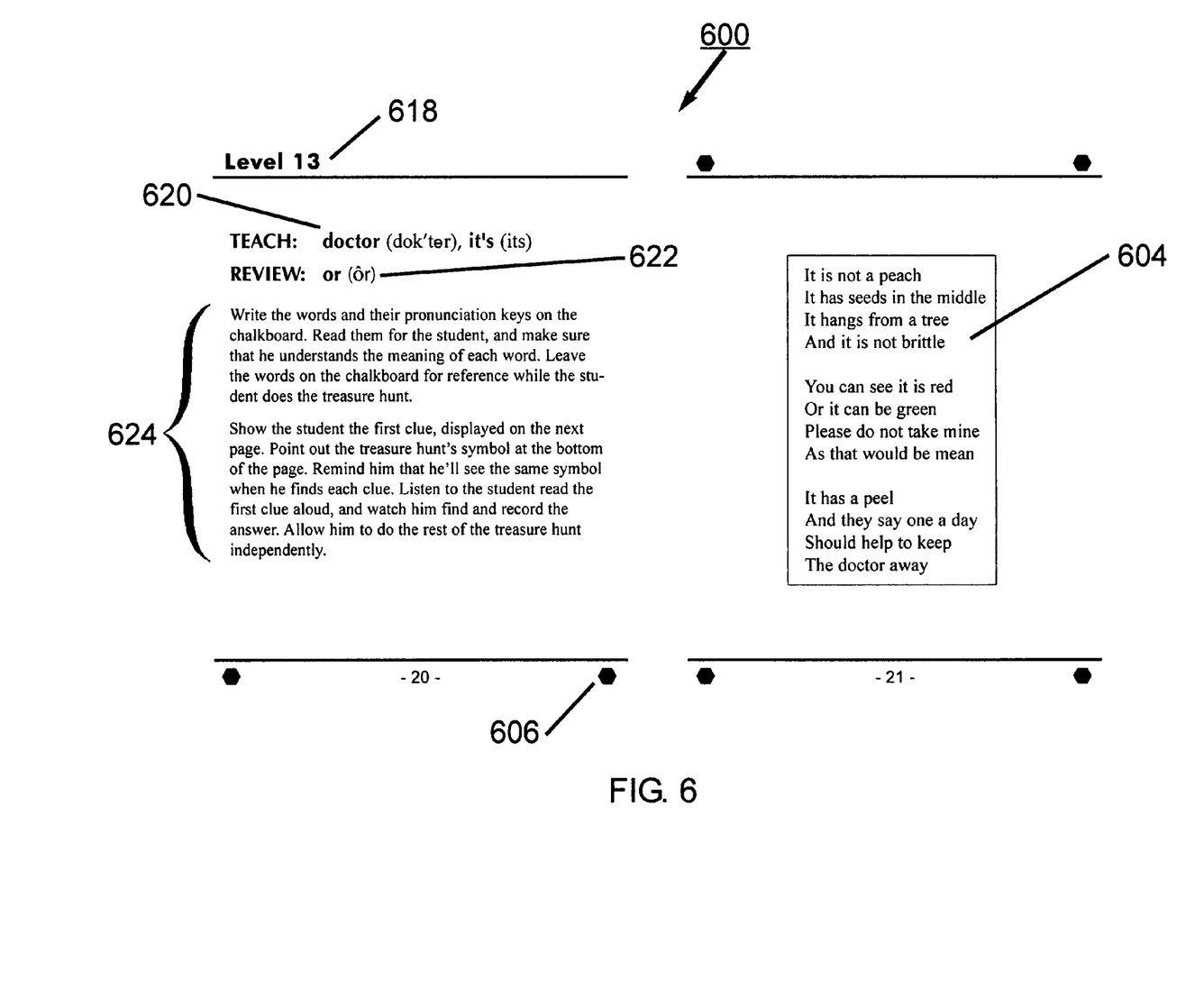
FIG. 6 illustrates still another display according to one embodiment of the invention where the display includes an item.

Referring now to FIG. 6, a display 600 (e.g., one or more pages in a book) includes material that an instructor can refer to and use to begin one or more students on a search designed to improve the student's educational skills (e.g., reading comprehension, dictionary skills) and cognitive skills (e.g., logical reasoning skills). In the embodiment shown in FIG. 6, the material is associated with a skill level 618 (e.g., "Level 13"). Indicia 606 provides a symbol that is associated with the material used to train students at skill level 13. The display 500 provides a previous example that included the identifier 510 which is associated with the same skill level as the material appearing in display 600, i.e., skill level 13 associated with hexagon-shaped indicia.

The display 600 can include one or more items of review material (e.g., items of educational material) that the instructor may review with students before they begin a search. The review material in the embodiment of FIG. 6, includes an item 620 and an item 622 as well as instructions 624. The item 620 can include one or more new words or concepts that are recommended for teaching to students at a particular skill level. In the example shown in FIG. 6, the words "doctor" and "its" are included for teaching to the students at skill level 13 before they begin the search associated with skill level 13 because level 13 students have not yet learned to read these words, but they are used in one or more of the clues they will need to read. In one embodiment, the item 622 is a word or concept that a student at that skill level has been exposed to, but may not remember. For example, in FIG. 6, the item 622 is the word "or." The word is provided to the instructor in display 600 to allow them to review the word with students at skill level 13 before the students begin the search.

In addition to the items identified above, review material can include: lists of words that should be reviewed with or taught to students because they are included in an upcoming search (the review can be a review of the meaning of the words and/or how to decode the words); directions and/or lessons for teaching cognitive skills; and lessons concerning the subject matter of an upcoming search. The subject matter lessons can include one or more of: a review of mathematical skills and/or concepts for mathematical searches; a review of geography for searches that include geography; a review of foreign language skills (including tense/conjugation and/or vocabulary) used in a foreign-language-based search; and pictures and/or illustrations including directions for leading focused discussions with students to build a subject-specific or environment-specific vocabulary and knowledge.

In the example shown in FIG. 6, the display also includes instructions 624 that describe how the instructor should employ the items 620, 622 in the lesson. The instructions 624 may also include guidance for the instructor regarding procedures that will assist the students when they begin the search. For example, a portion of the instructions 624 in FIG. 6 provide the following guidance:

Listen to the student read the first clue aloud, and watch him find and record the answer. Allow him to do the rest of the treasure hunt independently.

It should be recognized, however, that instructions 624 may not be included as part of a display associated with any specific skill level. Instead the medium in which the lesson plans are provided may include instructions that apply generally to each of the skill levels.

Display 600 also includes a clue 604. In the embodiment shown in FIG. 6, the clue 604 is a starting clue that forms the start of the search for skill level 13. Thus, at least as it is used in this embodiment, the clue 604 differs from the clues that were described previously (e.g., 304, 404) because the previous clues did not appear in the display (300, 400, respectively) as starting clues. The clue 604 is associated with an identifier included in a group of identifiers. Referring to FIG. 2 for example, the clue 604 is associated with the identifier "apple" listed in the group of identifiers 201. In the embodiment of FIG. 6, the clue 604 does not appear with an identifier because it is a starting clue used to begin a search.

As described above, in one embodiment, clues may be located by identifying a solution to the preceding clue. In one version, an identifier is not used with a starting clue because the starting clue is presented to the student, i.e., the student does not have to solve a preceding clue to locate the starting clue. Thus, in one example, the identifier "apple" is a solution to a starting clue (e.g., the clue 604). The identifier "apple" is used to locate the next clue in the search, e.g., the next clue is displayed along with the identifier "apple".

Figure 7:
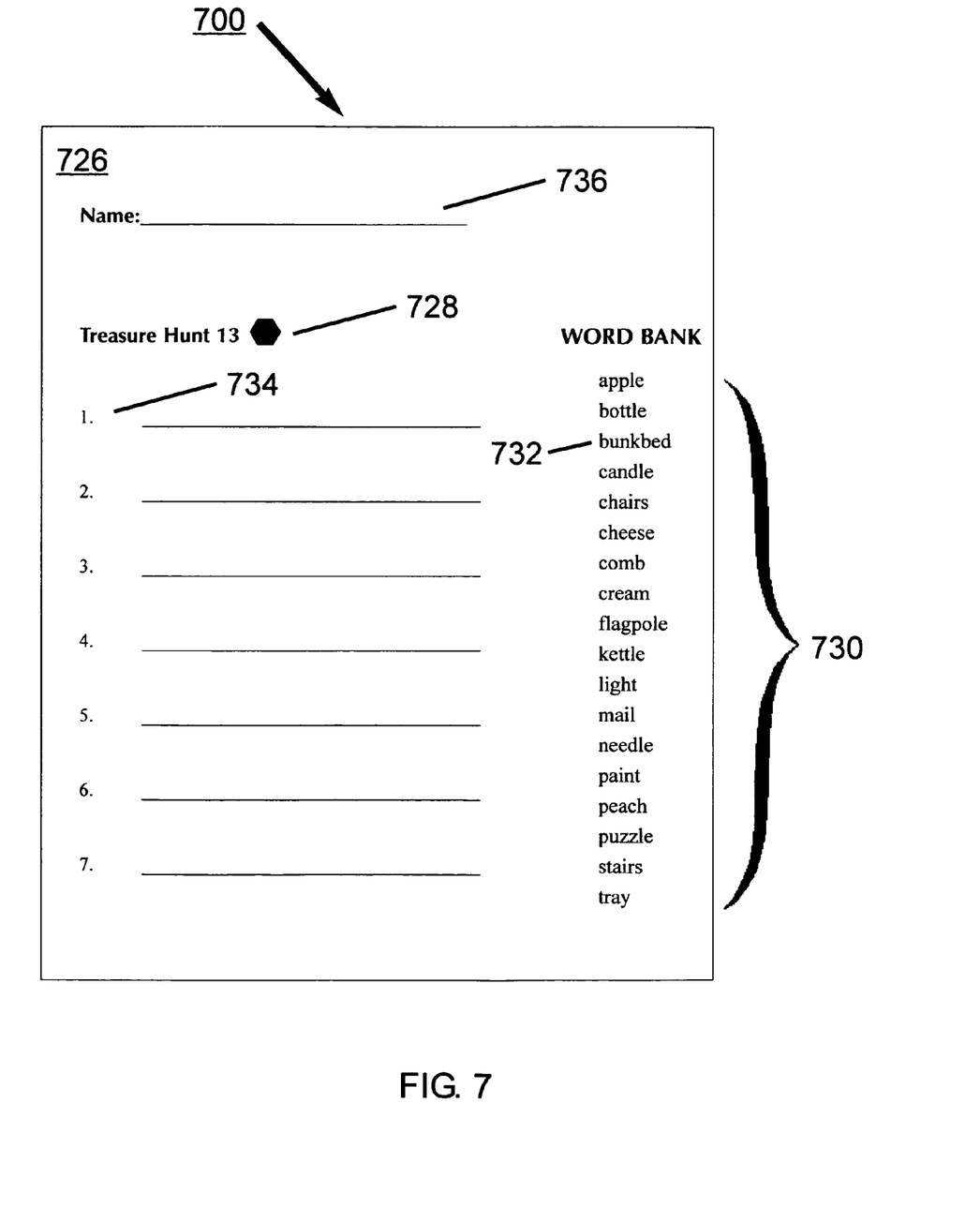
FIG. 7 illustrates a further display according to one embodiment of the invention where the display includes an answer form.

According to one embodiment, the educational system includes one or more answer forms that can be used to assist a student during the search process. As one example, FIG. 7 shows an answer form 726 that can be used by students as they conduct a search. The answer form 726 is included in a display 700 that, as previously described, can be displayed in a hardcopy medium (e.g., a book). The answer form 726 is associated with a search in which a student locates a series of clues by solving the clues using identifiers.

In one embodiment, the answer form is associated with a search designed for students at a particular skill level, i.e., a skill-level based search. An indicia 728 (e.g., a hexagon-shaped indicia) can be included in the answer form 726 to remind students of the indicia that they should find associated with each identifier and/or clue that they employ in the search.

According to one embodiment, the answer form 726 also includes a group of identifiers 730 associated with a skill level. In FIG. 7, each identifier 732 in the group of identifiers 730 is a word. In a version of this embodiment, the group of identifiers is referred to as a "word bank." It should be recognized, however, that an identifier or each identifier in the group of identifiers 730 may take some other form, for example, they may each be a number, a shape, a phrase, or a sentence. Providing a relatively short list of possible answers helps students with weak inferential reasoning skills solve the clues by allowing them to search the list to see if something seems to "fit" with the clue they just read. According to one embodiment, different types of identifiers are employed in a single skill-level based search.

Any of the eighteen (18) identifiers associated with skill level 13 in FIG. 7 may be employed in a search that is assigned to the student. The instructor, with or without the assistance of a lesson plan, selects a starting clue that suggests a first object and an associated identifier that solves the starting clue. The identifier associated with the first object provides the location of the next clue in the search. For example, where the first clue suggests the identifier "apple" as its solution, the clue located via that identifier may suggest the identifier "bowl" as its solution. As described previously with reference to FIGS. 3-5, the identifier "bowl" may provide a clue suggesting "stairs" and the identifier "stairs" may provide a clue suggesting "firewood." In this example, the identifier "firewood" may be associated with a reward (e.g., a treasure chest) awarded to the student at the end of the search.

In the embodiment shown in FIG. 7, a seven-clue search is completed with the answer form 726 by recording each of seven identifiers that solve the seven clues in locations 734. Generally, a search is completed by finding a solution to each clue in a specific ordered sequence. Thus, FIG. 7 provides an example where each location 734 is numbered with a number indicating where it falls in the sequence. For example, the identifier that solves the starting clue (e.g., "apple") would be placed on the answer form 726 adjacent to the number 1. In one embodiment, each answer form 726 also includes a location 736 where the student can record his or her name.

Answer form 726 may use another format, for example, a crossword puzzle format as shown below where the solutions to the clues (e.g., identifiers) are entered in boxes dedicated for them:

| Answer to first clue: | S | P | R | I | N | G |
|---|---|---|---|---|---|---|
| Answer to second clue: |  | F | A | L | L |  |
| Answer to third clue: | S | U | M | M | E | R |
| Answer to fourth clue: |  |  | P | L | U | M |

In one embodiment, multiple answers are entered in a crossword-puzzle style answer form 726 where the answers have a unifying theme (e.g., seasons). In the above example, another answer is created when the answer form is completed. For example, "ramp" is created and then used to locate the next page of clues.

In one embodiment, a completed answer form 726 can be used by a searcher to provide evidence that a search was completed successfully. Other forms of evidence may provide proof that a search was completed successfully, for example, a code (e.g., alpha, numerical or a combination of the two) may be derived from information provided with the clues. The completed answer form or other evidence can be hand-delivered, for example, to a teacher by a student upon completion of a search. The student may then receive a prize based on their completion of the search. Search participants may also forward evidence that a search was successfully completed via mail or electronically (e.g., over the Internet) to an instructor or an administrator who may award prizes to successful searchers.

Figure 8:
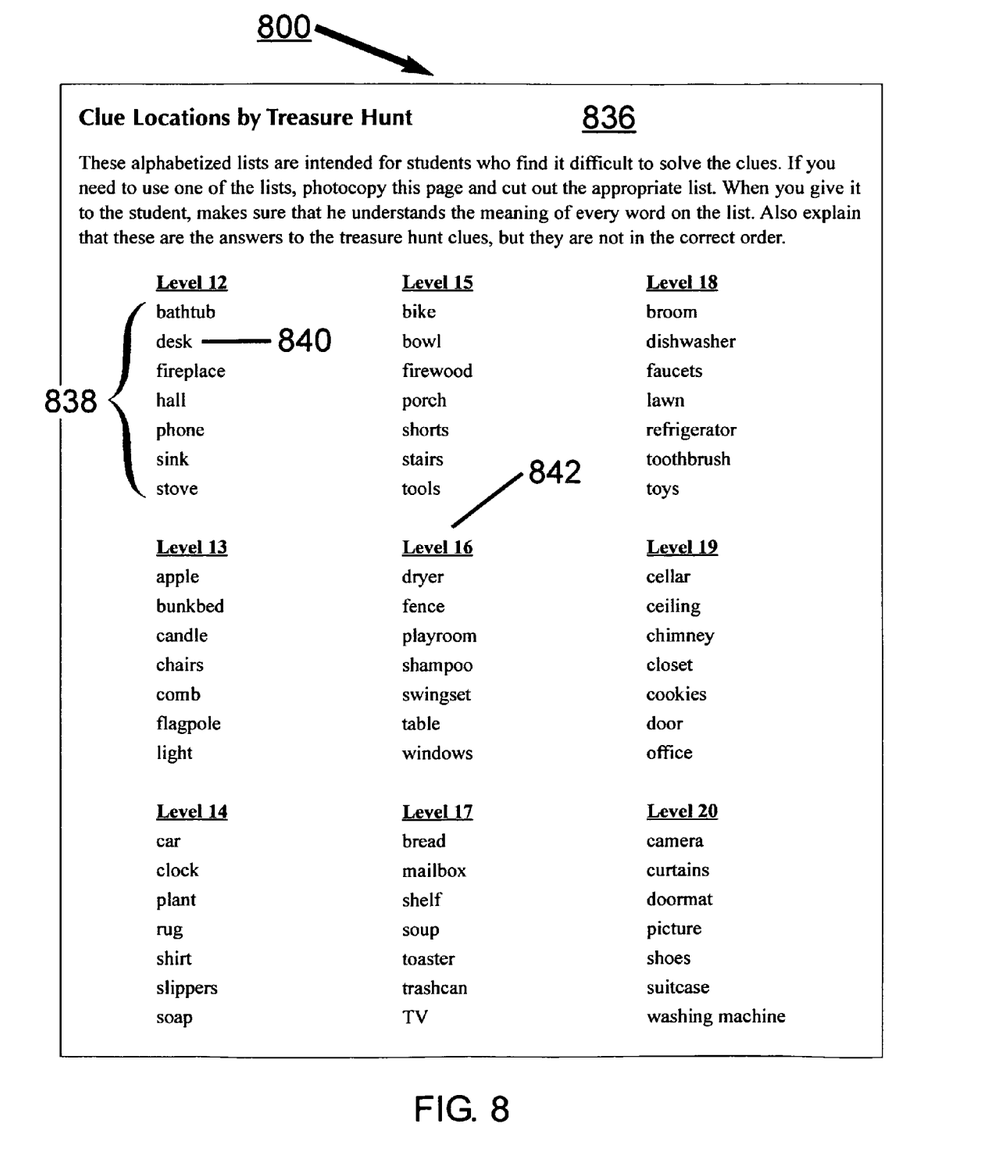
FIG. 8 illustrates a still further display according to one embodiment of the invention where the display includes a clue location index.

According to one embodiment, an educational and cognitive-skill training system includes one or more clue location indices that can be used to further assist a student during the search process. As one example, FIG. 8 shows a clue location index 836 included in a display 800 (e.g., on a page in a book). According to one embodiment, the clue location index 836 includes at least one list of identifiers 838 for each of one or more skill levels, i.e., a plurality of skill-level based lists of identifiers. The skill level is identified by indicia 842 (e.g., "Level 16"). Each list of identifiers includes a plurality of individual identifiers 840. As previously shown, the identifiers 840 can provide a means of locating clues that are used during the search.

The clue location index 836 can be used to assist students who are having difficulty solving the clues. For example, a search for students at skill level 12 may include a total of seven (7) identifiers, e.g., bathtub, desk, fireplace, hall, phone, sink, and stove. If the student is having difficulty finding a solution to one of the search clues they can refer to the list of identifiers 838 for skill level 12 to assist them in determining identifiers that may solve the clues. In one embodiment, to maintain some level of challenge for the student, the clues for any particular skill level are not listed in the order that they appear in a successful search, i.e., they are out of sequence.

In FIG. 8, the clue location index for skill level 13 includes seven of the eighteen identifiers include in the group of identifiers 730 associated with skill level 13 as shown in FIG. 7. In other words, the search selected for skill level 13 uses a subset of the complete set of identifiers available for skill level 13. For example, identifiers 730 can include "foils" (i.e., incorrect answers) so that it is not too easy to locate the correct answer. Any combination of student-aids may be employed.

According to one embodiment, student-aids may include one or more of the following: pronunciation keys; pictures and/or illustrations that represent words, phrases or concepts; indicia or other symbols that identify the search that a solution and/or clue is associated with; words that rhyme with a solution; illustrations or photographs of an environment; a map of an environment; and a word bank. Various embodiments of the word bank can include: a list of every identifier used in the book (in alphabetical or numerical order); a reading-level appropriate list of identifiers that includes some number of incorrect answers; and a list of every identifier used in a particular search. Generally, where a list of identifiers used in a search is provided, the identifiers are not presented in the correct order, for example, they may be placed in alphabetical or numerical order.

In one embodiment, a search is associated with a promotion of one or more products (e.g., food), businesses (e.g., store chains), places (e.g., resorts) or ideas (e.g., exercise is fun). For example, in one version of such an embodiment, a search uses a grocery store as a simulated environment and a particular grocery store chain and/or product is featured in the search. This approach allows a variety of information to be conveyed concerning the environment and the objects (e.g., products) found there.

The educational and cognitive-skill training systems described herein may be adapted for use with a plurality of instruction methodologies and training objectives. According to one embodiment, the educational and cognitive-skill system starts students at their point of deficit and sequentially teaches them mastery of each succeeding skill level. The students' skills can increase to include mastery of a plurality of skill levels (e.g., Level 12 through Level 20 referred to in FIG. 8). The systems described herein can employ multisensory strategies that can link one or more of visual, auditory, and tactile stimuli to assist students.

According to one embodiment, a curriculum encompasses: decoding and encoding skills, sight word recognition, structural analysis, use of contextual clues, dictionary access skills, decoding of diacritical symbols, and the complete spectrum of comprehension skills.

In a version of this embodiment, the cognitive-skill training system and methods employ one or more aspects of THE HERMAN METHOD. For example, to improve a student's chance of successfully completing a search, the student is not presented with unfamiliar words in the search and they are provided practice regarding recently-learned material. In one embodiment, each search is orthographically controlled, for example, for a specific assessed skill level.

In another embodiment, a skills assessment module provides the system with information concerning students' current skill levels (e.g., educational skill level, cognitive skill level or both). In a version of this embodiment, the system provides a treasure hunt that employs clues, objects and identifiers that are consistent with students' skill level as determined by the skills assessment module.

As described above, in one embodiment, the system can include multiple treasure hunts designed for a specific reading level within a medium along with: a section that contains an initial clue for each treasure hunt; instructions for a teacher concerning the treasure hunt; a section containing identifiers that provide solutions to the clues used in the treasure hunt where the identifiers are organized in alphabetical or numerical order and appear with a clue; indicia that distinguish each set of clues used in a single image; an image of a reward associated with the final answer in the search (e.g., associated with the identifier that solves the final clue in the search), an index for students that require extra support in solving a clue; and an answer key. Such a system provides students with: orthographically controlled reading practice; practice drawing inferences from the text; practice looking up words in an alphabetical listing; practice reading pronunciation keys, and practice writing and/or spelling words.

The static nature of a book format would not allow the features of a computerized search to be implemented in a book; however, the dynamic features of computer systems would allow the above-described approaches to be implemented in a computerized educational system. A computerized system might be beneficial because it would allow the inclusion of animation to bring to life many of the features that appear statically in a book format. For example, an environment may be presented to the user in an electronic display (e.g., a display included in one or more of a desktop computer, a laptop computer, a personal digital assistant, a cell phone display, etc.). The user may navigate through the environment to locate objects that are associated with the clues. According to one embodiment, an environment includes a home with a yard and a plurality of interior locations within the home. Through well known approaches, a user may navigate from the exterior of the home to the interior of the home to locate the objects referred to in the search. If the searcher uses a map to find their way through the environment, they may realize the additional benefit of practicing and enhancing visual-spatial cognitive skills (e.g., spatial localization, spatial orientation and spatial relations).

Where an electronic environment is employed, a searcher may select an object appearing in a first environment that is displayed to enter a second environment associated with the search. For example, a searcher may select the door to the house in order to enter the house and enter an interior environment. As another example, a plan view of a supermarket or other environment may be displayed to a searcher who navigates within the environment to locate objects (e.g., an apple in the produce section, a bagel in the bakery, etc.). This approach may have a side-benefit of teaching a searcher about a common environment that they may or may not be familiar with and teaching them about the various objects contained therein.

In one embodiment, the medium is a computer and both the identifiers (e.g., 201) and the environments are viewed in screens displayed by a computer-based system. For example, where the medium is a computer-based system, the user may select the individual identifier (e.g., 202) that is the solution to the first clue using a cursor. Once selected, the screen with information associated with the individual identifier is displayed by the computer-based system. A computer-based system may display all the information previously described with reference to the figures. Thus, a computer-based system may not only display clues and identifiers, but also, indicia, educational information, rewards, instructional aids, lesson plans, and student aids. Further, a computer display may do so in a dynamic fashion with audio communication and/or animated graphics that may increase a user's enjoyment. A computer-based system may, for example, allow the user to select the educational information (e.g., 308) to hear an audible pronunciation of the identifier (e.g., 302) generated by the computer-based system.

In the context of a computer-based education system, elements (e.g., identifiers) are separate or non-adjacent within the medium, if for example, they do not appear sequentially with the elements organized in a display when a user scrolls up or down within the display, e.g., on a web page. Although, as mentioned above, a group of identifier/clue combinations that are located in an unpredictable manner may include some identifiers that are adjacent although they solve clues that appear consecutively in the search. Further, the unpredictability of clue locations may be increased by using a computer-based system's storage capacity to retain and employ a large set of potential identifiers for each skill level.

Where a computer-based system is employed (e.g., a computer-based system provides the medium for storing identifiers and clues as well as for conducting the search), a user may supply their known skill level to the system and the computer-based system can automatically select a plurality of clues and identifiers suitable for the user. Alternatively, a user can take a test provided by the computer-based system to determine the user's skill level and automatically provide the user with a search based on the user's assessed skill level.

For those embodiments of the above invention that employ software, the software performing one or more of the above analyses may be loaded onto a computer, or provided on a computer readable media such as a diskette, compact disc, tape, or transmitted by electrical signal (such as modem or Internet).

According to one embodiment, an instructor selects a plurality of individual identifiers 202 from among the group of identifiers to form a search for a specific skill level where each identifier is associated with a clue.

Certain of the above-described embodiments of the present invention, therefore, can be implemented in any of numerous ways. When implemented in software, the software code can be executed on any suitable processor. It should further be appreciated that any single component or collection of multiple components of a computer system that performs the functions described above can be generically considered as one or more systems that perform the above-described functions. The one or more systems can be implemented in numerous ways, such as a modular system that can include a testing module, a dictionary module, an answer module, a search module and a user interface. In one embodiment, the testing module is used to test the reading skills and logical reasoning skills of a user and supply the test evaluation (e.g., a skill-level assessment) to the search module. The search module can then employ the test evaluation to provide a search that is appropriate given the skill level of the user.

Many of the embodiments described thus far are directed to reading skills, however, the approaches described herein may be employed with other educational material. According to one embodiment, a search may provide a set of mathematical problems as the clues and the numerical solutions as the identifiers. In a version of this embodiment, the clues consist of one or a combination of arithmetic skills (e.g., addition, subtraction, multiplication, division). For example, the numeral '4' is a solution to the clue '2×2=?'. Thus, a first clue (e.g., 2×2) leads to an identifier '4' that is co-located in the medium with another clue (e.g., 5×5). A set of clues in the preceding format, other formats or a combination of formats can be arranged as described concerning the other embodiments herein.

In addition, it will be understood by those of skill in the art that the systems and methods described herein can be employed to provide educational material for user's familiar with any language (Spanish, Japanese, French, German, etc.) or more than one language. For example, in one embodiment, an educational book provided in Spanish includes multiple treasure hunts designed for various reading levels. Such a system may provide students with orthographically controlled reading practice in a selected language.

Further, embodiments of the invention may be used in a formal educational setting that includes an instructor. One or more embodiments may also be used by a student or other user without the aid of an instructor.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of educating a user, comprising acts of:
organizing a plurality of clues in a book, wherein a clue comprises content for which there is an unstated solution or answer; and
providing at least one search including selected clues from the plurality of clues, wherein the at least one search is conducted in the book; and
selecting at least one educational objective for the at least one search; and
selecting a plurality of identifiers each of which consists of at least one word or number, wherein at least some of the identifiers represent correct solutions to the selected clues and at least some of the identifiers support the educational objective; and
creating clues wherein the unstated solution to each clue is represented by at least one of the selected identifiers and wherein at least some of the clues support the selected educational objective; and
organizing the selected identifiers in a predictable order and displaying them in that predictable order within the book; and
determining an order in which the selected clues are to be found and solved during the search which is unpredictable to the user, wherein the user's objective is to find and solve the clues in this predetermined order; and
providing the location of at least one starting clue used to begin the at least one search; and
displaying or associating each subsequent clue with each identifier that is a correct solution to the preceding clue in the search, and
providing at least one reward, a reward comprising an illustration and/or text; and
displaying or associating at least one reward with an identifier that is a correct solution to the final clue in a search, thereby providing a book in which the user can perform at least one search that involves finding a predetermined sequence of physically non-sequential clues, wherein the user determines the locations of the majority of the selected clues by solving the preceding clue in the search and looking up the solution among the predictably organized identifiers, thereby moving through the pages of the book in a non-sequential order to find the clues in their correct predetermined order, thereby also determining the correct predetermined order of the selected clue solutions represented as identifiers.

2. The method of claim 1, wherein the plurality of identifiers are words organized alphabetically within the book.

3. The method of claim 1, wherein the plurality of identifiers are numbers organized numerically within the book.

4. The method of claim 1, further comprising an act of instructing a user to create evidence of a successfully completed search.

5. The method of claim 4, further comprising an act of awarding a prize to a user who submits the evidence of a successfully completed search.

6. The method of claim 1, further comprising an act of providing at least one aid for the user.

7. The method of claim 6, wherein one aid for the user comprises indicia, one for each search, displayed with clues and rewards to indicate the search to which they belong.

8. The method of claim 6, wherein one aid for the user comprises an Answer Form, wherein spaces are provided for the user to write a correct identifier for each clue in the predetermined order.

9. The method of claim 6, wherein one aid for the user comprises pictures or illustrations that represent at least one word or one number.

10. The method of claim 6, wherein one aid for the user comprises pronunciation keys.

11. The method of claim 6, wherein one aid for the user comprises a list of possible solutions including solutions used in the search, wherein the possible solutions are not listed in the correct predetermined order.

12. The method of claim 1, further comprising an act of providing at least one aid for an instructor.

13. The method of claim 12, wherein the at least one aid for the instructor comprises material to teach or review with a student before the student begins the search.

14. The method of claim 1, wherein at least one educational objective is focused on at least one reading skill.

15. The method of claim 1, wherein at least one educational objective is focused on at least one math skill.

16. The method of claim 1, wherein at least one educational objective is focused on at least one cognitive skill.

17. The method of claim 1, wherein at least one educational objective is focused on knowledge in at least one subject area.

18. A method of entertaining a user, comprising acts of:

organizing a plurality of clues in a book, wherein a clue comprises content for which there is an unstated solution or answer; and providing at least one search including selected clues from the plurality of clues, wherein the at least one search is conducted in the book; and selecting a plurality of identifiers each of which consists of at least one word or number, wherein at least some of the identifiers are correct solutions to the selected clues; and creating clues wherein the unstated solution to each clue is represented by at least one of the selected identifiers; and organizing the selected identifiers in a predictable order and displaying them in that order within the book; and determining an order for the search clues and their corresponding solutions and identifiers which is unpredictable to the user, wherein the user's objective is to find and solve the clues in this predetermined order; and providing the location of at least one starting clue used to begin the at least one search; and displaying or associating each subsequent clue with each identifier that is a correct solution to the preceding clue in the search; and providing at least one reward, a reward comprising an illustration and/or text; and displaying or associating the at least one reward with an identifier that is a correct solution to the final clue in a search, thereby providing a book in which the user can perform at least one search that involves finding a predetermined sequence of physically non-sequential clues, wherein the user determines the locations of the majority of the selected clues by solving the preceding clue in the search and looking up the solution among the predictably organized identifiers, thereby finding the clues in their correct predetermined order and determining the correct order of the clue solutions represented as identifiers.

19. The method of claim 18, further comprising an act of instructing a user to create evidence of a successfully completed search.

20. The method of claim 19, further comprising an act of awarding a prize to a user who submits the evidence of the successfully completed search.

21. The method of claim 18, wherein the plurality of identifiers are words organized alphabetically within the book.

22. The method of claim 18, wherein the plurality of identifiers are numbers organized numerically within the book.

23. The method of claim 18, further comprising an act of providing at least one aid for the user.

24. The method of claim 23, wherein one aid for the user comprises indicia, one for each search, displayed with clues and rewards to indicate the search to which they belong.

25. The method of claim 23, wherein one aid for the user comprises an Answer Form, wherein spaces are provided for the user to write a correct identifier for each clue in the predetermined order.

26. The method of claim 23, wherein one aid for the user comprises pictures or illustrations that represent at least one word or one number.

27. The method of claim 23, wherein one aid for the user comprises pronunciation keys.

28. The method of claim 23, wherein one aid for the user comprises a list of possible solutions including solutions used in the search, wherein the possible solutions are not listed in the correct predetermined order.

\* \* \* \* \*